(12) United States Patent
Miyamori et al.

(10) Patent No.: US 10,184,013 B2
(45) Date of Patent: Jan. 22, 2019

(54) MODIFIED PLANT FIBERS, ADDITIVE FOR RUBBER, PROCESS FOR PRODUCING SAME, AND RUBBER COMPOSITION

(71) Applicant: SEIKO PMC CORPORATION, Chuo-Ku, Tokyo (JP)

(72) Inventors: Ryo Miyamori, Chiba (JP); Syuichi Ohira, Chiba (JP); Daisuke Kuroki, Chiba (JP)

(73) Assignee: SEIKO PMC CORPORATION, Tokyo (JP)

( * ) Notice: Subject to any disclaimer, the term of this patent is extended or adjusted under 35 U.S.C. 154(b) by 0 days.

(21) Appl. No.: 15/578,631

(22) PCT Filed: Jun. 22, 2016

(86) PCT No.: PCT/JP2016/068550
§ 371 (c)(1),
(2) Date: Nov. 30, 2017

(87) PCT Pub. No.: WO2016/208634
PCT Pub. Date: Dec. 29, 2016

(65) Prior Publication Data
US 2018/0162960 A1 Jun. 14, 2018

(30) Foreign Application Priority Data

Jun. 22, 2015 (JP) ................................ 2015-124471

(51) Int. Cl.
| | | |
|---|---|---|
| C08L 97/02 | (2006.01) | |
| C08C 19/28 | (2006.01) | |
| C08B 3/20 | (2006.01) | |
| C08G 81/00 | (2006.01) | |
| C08L 1/08 | (2006.01) | |
| C08L 7/00 | (2006.01) | |
| C08L 15/00 | (2006.01) | |
| C08L 21/00 | (2006.01) | |
| B29B 7/00 | (2006.01) | |
| C08J 5/04 | (2006.01) | |
| C08L 9/00 | (2006.01) | |
| B29B 7/74 | (2006.01) | |
| B29B 7/90 | (2006.01) | |
| B29B 7/92 | (2006.01) | |

(52) U.S. Cl.
CPC ............. *C08C 19/28* (2013.01); *B29B 7/002* (2013.01); *B29B 7/005* (2013.01); *B29B 7/7495* (2013.01); *B29B 7/905* (2013.01); *B29B 7/92* (2013.01); *C08B 3/20* (2013.01); *C08G 81/00* (2013.01); *C08J 5/045* (2013.01); *C08L 1/08* (2013.01); *C08L 7/00* (2013.01); *C08L 9/00* (2013.01); *C08L 15/00* (2013.01); *C08L 21/00* (2013.01); *C08L 97/02* (2013.01); *C08L 2205/16* (2013.01)

(58) Field of Classification Search
CPC ........................................................ C08L 97/02
See application file for complete search history.

(56) References Cited

U.S. PATENT DOCUMENTS

| | | | | |
|---|---|---|---|---|
| 4,659,754 A * | 4/1987 | Edwards | .................... | C08J 3/22 523/214 |
| 5,852,079 A * | 12/1998 | Loreth | .................. | B60C 1/0016 524/35 |
| 7,897,662 B2 * | 3/2011 | Klinkenberg | ........... | C08L 21/00 524/35 |
| 8,735,470 B2 * | 5/2014 | Takizawa | ................. | C08J 3/226 524/35 |
| 9,540,453 B2 * | 1/2017 | Harada | ...................... | C08L 1/10 |
| 2005/0197442 A1* | 9/2005 | Jones | ....................... | C08L 23/22 524/474 |
| 2009/0036609 A1* | 2/2009 | Feng | ................... | C08L 23/0807 525/220 |
| 2010/0029809 A1 | 2/2010 | Kuroda | | |

(Continued)

FOREIGN PATENT DOCUMENTS

| | | |
|---|---|---|
| JP | H03-224713 A | 10/1991 |
| JP | 2002-115173 A | 4/2002 |

(Continued)

OTHER PUBLICATIONS

Kuraray (Kuraray Liquid Rubber, 2016) (Year: 2016).*
International Search Report of related application PCT/JP2017/068550 dated Jul. 19, 2016.

*Primary Examiner* — Liam J Heincer
(74) *Attorney, Agent, or Firm* — Arent Fox LLP

(57) ABSTRACT

Provided are modified plant fibers suitable for addition to rubber; an additive for rubber comprising the modified plant fibers which can be micronized and dispersed easily and highly when adding to rubber; a method of preparing the additive for rubber; and a rubber composition comprising the additive for rubber. Modified plant fibers (A) in which plant fibers (a) and a modified synthetic rubber (B) are covalently bonded wherein the ratio of the modified synthetic rubber (B) relative to 100 parts by weight of the plant fibers (a) is 5 to 100 parts by weight. An additive for rubber comprising 20 to 75 weight % of the modified plant fibers (A) according to claim 1 and 25 to 80 weight % of a processing agent for rubber (C), wherein the number average molecular weight of the processing agent for rubber (C) is 400 to 60,000, and the glass transition point of the processing agent for rubber (C) is 100° C. or less, and wherein the additive for rubber includes plant fibers in the ratio of 10 to 65 weight %.

15 Claims, 1 Drawing Sheet

(56) References Cited

U.S. PATENT DOCUMENTS

| | | | | |
|---|---|---|---|---|
| 2013/0150488 A1* | 6/2013 | Feng | ................... | C08L 97/02 |
| | | | | 524/9 |
| 2013/0150500 A1* | 6/2013 | Shelby | ................ | C08K 5/1545 |
| | | | | 524/41 |
| 2016/0297953 A1* | 10/2016 | Cornish | ................... | C08L 7/00 |
| 2016/0340501 A1* | 11/2016 | Miyazaki | ............. | B60C 1/0016 |

FOREIGN PATENT DOCUMENTS

| | | |
|---|---|---|
| JP | 2006-206864 A | 8/2006 |
| JP | 2009-263417 A | 11/2009 |
| JP | 2010-254925 A | 11/2010 |
| JP | 2011-006551 A | 1/2011 |
| JP | 2011-246509 A | 12/2011 |
| JP | 2011-246615 A | 12/2011 |
| WO | WO 2008/053817 A1 | 5/2008 |

* cited by examiner

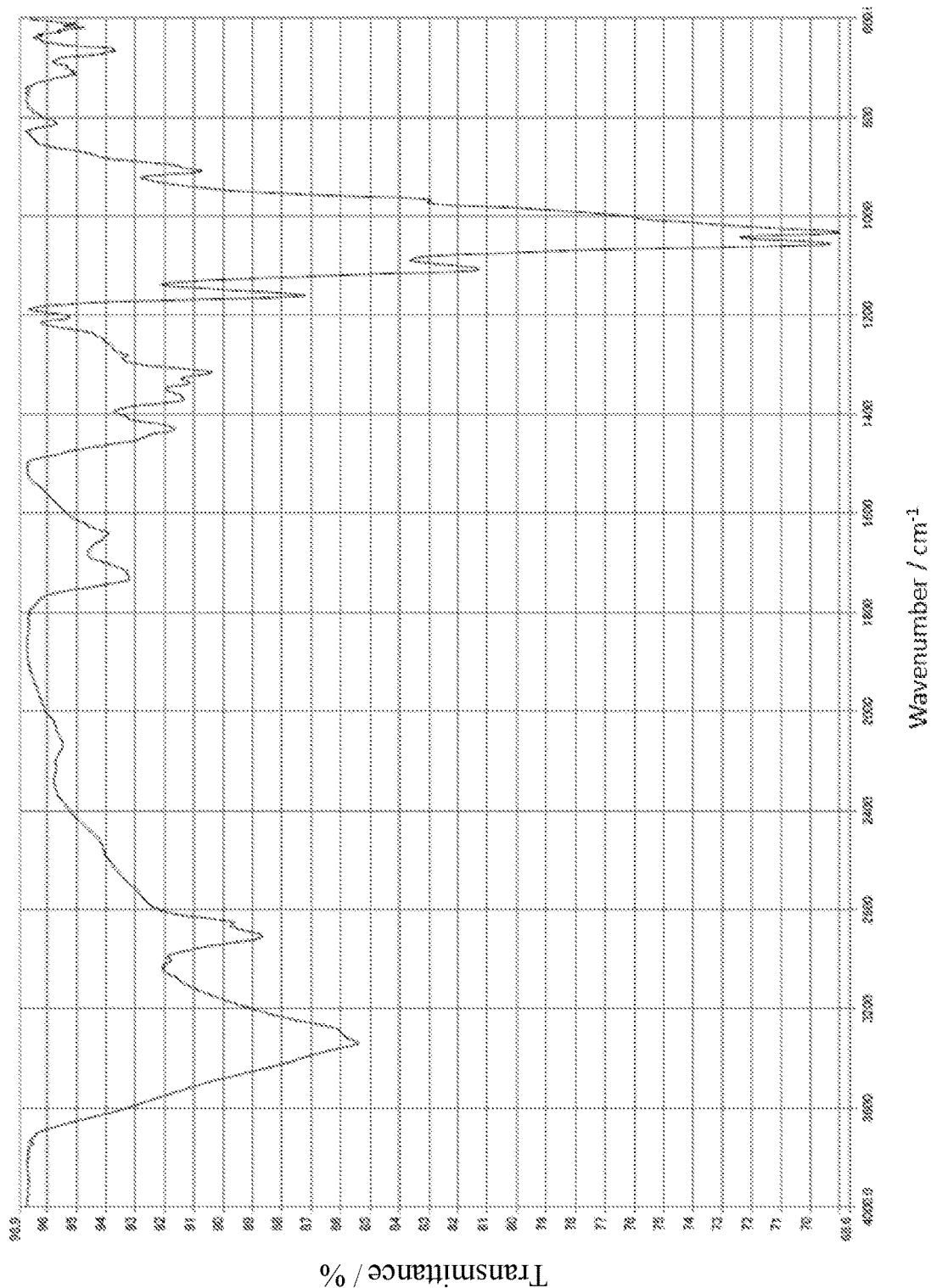

US 10,184,013 B2

MODIFIED PLANT FIBERS, ADDITIVE FOR RUBBER, PROCESS FOR PRODUCING SAME, AND RUBBER COMPOSITION

CROSS-REFERENCE TO RELATED APPLICATIONS

This application is a National Stage entry of International Application No. PCT/JP2016/068550, filed Jun. 22, 2016, which claims priority to Japanese Patent Application No. 2015-12447, filed Jun. 22, 2015. The disclosures of the priority applications are incorporated in their entirety herein by reference.

TECHNICAL FIELD

The present invention relates to modified plant fibers suitable for addition to rubber, an additive for rubber containing the modified plant fibers, a method of preparing the additive for rubber, and a rubber composition containing the additive for rubber.

BACKGROUND ART

Conventionally, carbon fibers, glass fibers and the like are widely and generally used as a reinforcing material used for resins for molding materials. However, since carbon fibers are flame retardant, they are unsuitable for thermal recycling and are expensive. Glass fibers are relatively inexpensive, but have a problem in disposal.

Meanwhile, since plant fibers are relatively inexpensive and excellent in thermal recycling, development of techniques to utilize them as fillers for rubber materials has been investigated. However, hydrophilic plant fibers have poor dispersibility in hydrophobic rubber, so that plant fibers added to rubber aggregate and do not exert reinforcing effect, which cause deterioration of mechanical properties such as strength and the like conversely.

To such problems, various investigations have been made to improve dispersibility of plant fibers in rubber. In Patent Literature 1, fine plant fibers dispersed in water are mixed and stirred with a rubber latex, and water is removed to obtain a masterbatch having good dispersibility in rubber. In Patent Literature 2, affinity of fiber/rubber interface is enhanced by grafting monomers or polymers to plant fibers. However, in case of using these methods, several ten times amount of water relative to plant fibers is necessary for appropriately dispersing the micronized plant fibers, and after mixing with the latex, a large amount of water has to be removed, so that there is a problem of poor work efficiency.

Patent Literature 3 discloses a method of improving affinity of fiber/rubber interface by introducing vinyl groups to surface of plant fibers and further improving the affinity by bonding of the rubber and the fibers at the time of vulcanization. However, the plant fibers were not sufficiently dispersed.

In Patent Literature 4, a rubber composition is obtained by adding and mixing so that content of plant fibers is 5 parts by weight or more relative to 100 parts by weight of a diene rubber containing 20 parts by weight or more of a modified diene rubber having functional groups capable of bonding to hydroxyl groups on surface of dry plant fibers. However, the plant fibers did not reach a satisfactory dispersion state.

CITATION LIST

Patent Literature

Patent Literature 1: JP 2006-206864
Patent Literature 2: JP 2009-263417
Patent Literature 3: JP 2010-254925
Patent Literature 4: JP 2011-006551

SUMMARY OF THE INVENTION

Technical Problem

Objects of the present invention are to provide modified plant fibers having an enhanced affinity to rubber, an additive for rubber capable of dispersing easily and finely the modified plant fibers in rubber, a method of preparing the additive for rubber and a rubber composition containing the additive for rubber.

Solution to the Problem

The present inventors earnestly studied to solve the problems, and have unexpectedly found that by kneading modified plant fibers in which a modified synthetic rubber is covalently bonded to plant fibers in advance and a processing agent for rubber having high affinity to rubber, and micronizing the plant fibers, a resin composition can be obtained in which the modified plant fibers is easily and finely dispersed when added to rubber. And thus, the present inventors have completed the present invention.

That is, the present invention relates to,
(1) Modified plant fibers (A) in which plant fibers (a) and a modified synthetic rubber (B) are covalently bonded wherein the ratio of the modified synthetic rubber (B) relative to 100 parts by weight of the plant fibers (a) is 5 to 100 parts by weight.
(2) An additive for rubber comprising 20 to 75 weight % of the modified plant fibers (A) according to the above (1) and 25 to 80 weight % of a processing agent for rubber (C),
wherein the number average molecular weight of the processing agent for rubber (C) is 400 to 60,000, and the glass transition point of the processing agent for rubber (C) is 100° C. or less, and
wherein the additive for rubber includes plant fibers in the ratio of 10 to 65 weight %.
(3) The additive for rubber according to the above (2), wherein the modified plant fibers (A) are micronized modified plant fibers.
(4) The additive for rubber according to the above (2) or (3), wherein the modified synthetic rubber (B) is a maleic anhydride modified diene rubber.
(5) The additive for rubber according to the above (4), wherein the maleic anhydride modified diene rubber is a maleic anhydride modified polybutadiene and/or a maleic anhydride modified polyisoprene.
(6) A method of preparing the additive for rubber according to any one of the above (2) to (5) comprising,
a step of reacting the plant fibers (a) and the modified synthetic rubber (B) in the processing agent for rubber (C), to obtain a mixture containing modified plant fibers (D); and
a step of kneading the mixture (D) at a lower temperature than the temperature in the first step, to micronize the fibers.
(7) A rubber composition comprising the additive for rubber according to any one of the above (2) to (5), wherein the rubber composition includes plant fibers in the ratio of 0.01 to 30 parts by weight relative to 100 parts by weight of matrix rubber.

(8) The modified plant fibers according to the above (1), wherein the modified plant fibers (A) are micronized modified plant fibers.

(9) The modified plant fibers according to the above (1) or (8), wherein the modified synthetic rubber (B) is a maleic anhydride modified diene rubber.

(10) The modified plant fibers according to the above (9), wherein the maleic anhydride modified diene rubber is a maleic anhydride-modified polybutadiene and/or a maleic anhydride modified polyisoprene.

Advantageous Effects of the Invention

The modified plant fibers of the present invention are sufficiently covalently bonded since a modified synthetic rubber is used in a sufficient amount to plant fibers. Therefore, the modified plant fibers are easily and sufficiently micronized in the additive for rubber obtained by kneading the modified plant fibers and a specific processing agent for rubber. Accordingly, it is possible to obtain a rubber composition in which the modified plant fibers are highly homogeneously dispersed, by adding the additive for rubber of the present invention to the rubber.

BRIEF DESCRIPTION OF THE DRAWINGS

FIG. 1 is an IR chart of the modified plant fibers obtained by reacting and esterifying Ricon® 130MA8 (maleic anhydride modified polybutadiene, available from Clay Valley USA, LLC) with plant fibers.

DESCRIPTION OF THE INVENTION

The modified plant fibers (A) of the present invention may be obtained by making a modified synthetic rubber (B) be covalently bonded with plant fibers (a). Publicly known methods may be used as a covalent bonding method.

Non-limiting examples of plant fibers (a) that can be used to obtain the modified plant fibers (A) include plant derived fibers contained in wood, bamboo, hemp, jute, kenaf, cotton, beet or the like; pulp prepared from the plant derived fibers; mercerized cellulose fibers; regenerated cellulose fibers such as rayon, cellophane, lyocell or the like; acid anhydride modified cellulose fibers and the like. Among these, preferred plant fibers materials include wood such as Sitka spruce, *Cryptomeria, Chamaecyparis, Eucalyptus, Acacia*, or the like. Thus, plant fibers obtained by defibrating pulp, paper, or waste paper made from these materials can be suitably used. Each type of these plant fibers may be used alone, or two or more types selected therefrom may be used.

Examples of the pulp include those obtained by chemical pulping, mechanical pulping, or chemical and mechanical pulping of the above plant materials, such as mechanical pulp (MP), chemical pulp (CP), semichemical pulp (SCP) and the like. More specifically, the pulp includes chemi-ground pulp (CGP), chemi-mechanical pulp (CMP), ground wood pulp (GP), refiner mechanical pulp (RMP), thermomechanical pulp (TMP), or chemi-thermomechanical pulp (CTMP), chemi-mechanical pulp (kraft pulp (KP), sulfite pulp (SP)) and the like. Among these pulp, preferred is kraft pulp (KP).

The plant fibers (a) may be one in which hydroxyl groups in the modified plant fibers (A) are esterified or partially substituted by functional groups such as carboxyl groups, as long as the reactivity and degree of substitution with the modified synthetic rubber, and the compatibility with resin are not largely affected and an additive for rubber having desired dispersibility can be obtained without difficulty.

The modified synthetic rubber (B) used in the present invention is not particularly limited as long as it is rubber having functional groups capable of reacting with the plant fibers (a), but the modified synthetic rubber (B) preferably has double bonds in the molecule. When the modified synthetic rubber (B) has double bonds in the molecule, affinity may be enhanced by crosslinking a rubber molecule and the modified plant fibers (A), when adding a crosslinking agent such as sulfur and crosslinking rubber molecules with each other (hereinafter referred to as vulcanization). The modified synthetic rubber having double bonds is preferably a diene rubber, more preferably a modified polybutadiene or a modified polyisoprene. A method of polymerizing rubber is not particular limited, and a vinyl group may exist in the side chain of the molecule as a result of including a 1,2-added component in addition to a 1,4-added component of the diene monomer during polymerization.

The functional group capable of reacting with the plant fibers (a) included in the modified synthetic rubber (B) is not particularly limited, but may include an aldehyde group, an epoxy group, an isocyanate group, a carboxyl group, an alkoxysilyl group, an acid anhydride group and the like. Among them, an acid anhydride group is preferable in terms of reactivity and handling. A method of ester formation of an acid anhydride and the plant fibers (a) is not particular limited, and they may be mixed and heated, or a catalyst may be used.

Examples of the acid anhydride group contained in the modified synthetic rubber (B) within the molecular include a structure of a $C_4$-$C_{10}$, preferably $C_4$-$C_6$ cyclic carboxylic anhydride such as succinic anhydride, maleic anhydride, citraconic anhydride, itaconic anhydride, tetrahydrophthalic anhydride, and the like. Among these, succinic anhydride modified synthetic rubber and maleic anhydride modified synthetic rubber may be suitably used, because these acid anhydrides themselves are poorly homopolymerizable and are more readily reactable with the plant fibers (a).

The modified plant fibers (A) is obtained by covalent bonding of the modified synthetic rubber (B) to hydroxyl groups of the plant fibers (a). Type of the covalent bonding is not particularly limited, but examples of the covalent bonding include urethane bond, ether bond, silyl ether bond and ester bond. Among these, ester bond is preferably used. A method for carrying out esterification reaction is not particularly limited, and esterification reaction may be carried out by a commonly used method, and a catalyst may be added. For example, the following methods may be used.

(I) The modified synthetic rubber (B) is added and reacted to a dispersion in which the plant fibers (a) are dispersed in a solvent.

(II) The plant fibers (a) is directly mixed and reacted with the modified synthetic rubber (B).

The amount of the modified synthetic rubber (B) bonded to the plant fibers (a) is required to be 5 to 100 parts by weight relative to 100 parts by weight of the plant fibers (a), in consideration of reaction efficiency and affinity to rubber. The amount is preferably 6 to 85 parts by weight, more preferably 7 to 70 parts by weight, most preferably 8 to 60 parts by weight. When the amount is less than 5 parts by weight, affinity to rubber becomes insufficient, dispersion becomes insufficient, and mechanical strength of the rubber composition decreases. When the amount is more than 100 parts by weight, properties as rubber become strong and the fiber shape may not be maintained. An addition ratio of the modified synthetic rubber (B) to the plant fibers (a) can be calculated by a calculation method carried out in Examples described below.

The additive for rubber of the present invention may be obtained by conjugating the modified plant fibers (A) and the processing agent for rubber (C). Content of the modified plant fibers contained in the additive for rubber is preferably 20 to 75 weight %, more preferably 25 to 70 weight %. When content of the modified plant fibers is within this range, aggregation of fibers is difficult to occur due to sufficient shearing force applied at the time of melting and kneading, and an additive for rubber having excellent dispersibility in rubber can be obtained.

Content of plant fibers contained in the additive for rubber is preferably 10 to 65 weight %, more preferably 15 to 60 weight %. Plant fibers refer to the component derived from the plant fibers (a) in the modified plant fibers (A) contained in the additive for rubber. When content of plant fibers is within this range, aggregation of fibers is difficult to occur due to sufficient shearing force applied at the time of melting and kneading, and the additive for rubber having excellent dispersibility in rubber can be obtained.

Types of the processing agent for rubber (C) used in the present invention are not particularly limited as long as they are general processing agents for rubber added for improvement of processability of rubber. The processing agent for rubber having good compatibility with rubber are preferable. Examples of the processing agent for rubber (C) include petroleum resins, coal resins, terpene resins, rosin resins, phenol resins, liquid rubbers, process oils, factice and the like. Petroleum resins, coal resins, phenol resins and liquid rubbers are preferable. Among these, petroleum resins, phenol resins and liquid rubbers are particularly preferable.

Examples of the petroleum resin include C5 petroleum resins, C9 petroleum resins, C5/C9 petroleum resins, dicyclopentadiene resin, hydrogenated materials of the foregoing resins, and modified materials of the foregoing resins obtained by addition of cyclic polybasic acid anhydrides such as maleic anhydride.

Examples of the coal resin include coumarone resin, coumarone-indene resin, hydrogenated materials of the foregoing resins, modified materials of the foregoing resins obtained by addition of cyclic polybasic acid anhydrides such as maleic anhydride.

Examples of the terpene resin include α-pinene resin, β-pinene resin, terpene phenol resin, aromatic modified terpene resins, hydrogenated materials of the foregoing resins, and modified materials of the foregoing resins obtained by addition of cyclic polybasic acid anhydrides such as maleic anhydride.

Examples of the rosin resin include gum rosin, wood rosin, tall rosin, hydrogenated rosins prepared from the foregoing rosins, disproportionated rosins, maleic acid modified rosins, fumaric acid modified rosins, (meth)acrylic acid modified rosins, esterified rosins obtained by condensation with alcohols, and phenol modified rosins.

The phenol resin is not particularly limited as long as it is a reaction product of a compound having a phenol structure and formaldehyde. Examples thereof include novolac and resol, and novolac is preferable, and specifically novolac not containing a curing agent is more preferable.

Examples of the liquid rubbers include polyisoprene, polybutadiene, styrene-butadiene copolymer, styrene-isoprene copolymer, styrene-isoprene-butadiene copolymer, acrylonitrile-butadiene copolymer, ethylene-propylene-diene copolymer, and a modified material thereof. Among these, one or more of polyisoprene, polybutadiene, and a modified material thereof are preferable, and maleic anhydride modified polybutadiene and/or maleic anhydride modified polyisoprene are particularly preferable.

The processing agent for rubber (C) used in the present invention is at least one selected from processing agents for rubber having a glass transition point of 100° C. or less. When the glass transition point exceeds 100° C., mechanical strength of the rubber composition decreases, due to insufficient dispersion at the time of adding the additive for rubber to the rubber. The glass transition point of the processing agent for rubber (C) is particularly preferably 90° C. or less, more preferably 80° C. or less, further preferably 70° C. or less, most preferably 60° C. or less.

A number average molecular weight of the processing agent for rubber (C) used in the present invention in terms of polystyrene measured by gel permeation chromatography, is preferably 400 to 60,000, more preferably from 500 to 55,000, further preferably 600 to 50,000. When the number average molecular weight is less than 400, micronization of the modified plant fibers (A) becomes insufficient due to too low melt viscosity, and as a result, mechanical strength of the molded product may be lowered. On the other hand, when the number average molecular weight exceeds 60,000, due to high melt viscosity, kneading of the modified plant fibers (A) with the processing agent for rubber (C) or kneading of the additive for rubber and the rubber becomes difficult, and the dispersion of the modified plant fibers (A) becomes insufficient and mechanical strength of the molded product may be lowered.

The additive for rubber of the present invention may be also obtained by reacting and esterifying the plant fibers (a) and the modified synthetic rubber (B) during kneading, and further kneading them with the processing agent for rubber (C) to micronize the modified plant fibers (A). In case of using this method, the step of modification by adding a solvent is not present and the step of removing solvents after the modification reaction is not present, so that productivity is improved and environmental burden is reduced.

In the present invention, micronization of the modified plant fibers (A) means that the modified plant fibers (A) are defibrated, specifically, the modified plant fibers are defibrated so that the width is 5 μm or less. Defibration state of fibers can be observed by a method carried out in Examples described below.

When the additive for rubber of the present invention is added to the rubber, the modified plant fibers (A) are dispersed homogeneously, whereby a rubber composition with improved hardness can be obtained. Rubber to which the additive for rubber is added (hereinafter referred to as matrix rubber) is not particularly limited, but specifically includes natural rubber, synthetic polyisoprene, polybutadiene, styrene-butadiene copolymer, styrene-isoprene copolymer, styrene-isoprene-butadiene copolymer, acrylonitrile-butadiene copolymer, ethylene-propylene-diene copolymer, ethylene-propylene copolymer, and a modified material thereof, and natural rubber, polybutadiene and a modified material thereof are preferable.

EXAMPLE

Hereinafter, Examples of the present invention are explained. But, the present invention is not limited to these Examples.

The following describes the evaluation methods.
(1) Measurement of Defibration State An amount of 0.2 g of an additive for rubber (or rubber added with an additive for rubber), and 100 g of tetrahydrofuran (or toluene) were charged into a flask. The soluble portion was dissolved by applying ultrasonic wave, and modified plant fibers were dispersed to obtain a modified plant fibers slurry. Then, the slurry was sampled and the dispersion state of the fibers was observed at a magnification of 1000 times using a digital microscope (VHX-600, available from Keyence Corporation). The measurement result was marked as follows, "Good" when number of fibers having a width of 5 μm or more is 1 or 0 in 100 fibers;

"Average" when number of fibers having a width of 5 μm or more is 2 or more in 100 fibers, and number of fibers having a width of 10 μm or more is 1 or 0 in 100 fibers; and "Poor" when number of fibers having a width of 10 μm or more is 2 or more in 100 fibers.

(2) Monitoring of Progress of Modification Reaction

The progress of modification reactions was observed using a Fourier transform infrared spectrometer "Spectrum one" available from Perkin Elmer. Specifically, the intensity of the peak associated with the stretching vibration of the carbonyl carbon and oxygen in the ester bond between 1,650 and 1,750 cm$^{-1}$, which increases along with the progress of the modification reaction, was qualitatively monitored.

(3) Measurement of the Addition Ratio of Modified Synthetic Rubber to Plant Fibers The addition ratio was calculated from the change in the weight of the plant fibers before and after modification according to the equation (I) below. The sample to be evaluated for addition ratio was washed with a sufficient amount of a solvent before the measurement. A good solvent for the modified synthetic rubber was selected appropriately as the solvent for washing.

$$Wp=(W-Ws)\times 100/Ws \quad (I)$$

Wp: addition ratio (weight %) of modified synthetic rubber to plant fibers

W: dry weight (g) of modified plant fibers after modification (modified plant fibers)

Ws: dry weight (g) of plant fibers before modification (4) Measurement of Solid Content The solid content was measured using an infrared moisture balance ("FD-620" available from Kett Electric Laboratory).

(5) Confirmation of Dispersion State

An additive for rubber was added to 100 parts by weight of matrix rubber (natural rubber) so that content of plant fibers was 5 parts by weight, and kneaded. The obtained kneaded mixture was pressed at 100° C. to prepare a rubber film having a thickness of 0.1 mm. Then, the rubber film was sandwiched between polarizing plates in a crossed-Nicols state, and the dispersion state of the fibers in the rubber was observed at a magnification of 100 times using a digital microscope (VHX-600, available from Keyence Corporation). The measurement result was marked as follows, "Poor" when there is a fibers aggregate having a minor axis length of 100 μm or more; and "Good" when there are no fibers aggregates having a minor axis length of 100 μm or more.

(6) Measurement of Rubber Hardness

Rubber hardness of a disc shaped rubber molded product was measured according to JIS K 6253 using an A-type Hardness Tester (GS-706N, available from TECLOCK Corporation).

Example 1

[Preparation of Modified Plant Fibers (A-1)]

An amount of 250.0 parts by weight (solids: 50.0 parts by weight) of a water wet needle bleached kraft pulp (hereinafter, referred to as NBKP) and 200.0 parts by weight of N-methylpyrrolidone were charged into a vessel, and the water was evaporated off to give a solvent replaced NBKP. The temperature inside the system was adjusted to 70° C., and 50.0 parts by weight of Ricon® 130MA13 (maleic anhydride modified polybutadiene, 1,2 addition ratio 28%, available from Clay Valley USA, LLC) and 8.5 parts by weight of potassium carbonate as a catalyst for esterification were introduced into the system and reacted for 2 hours. The reaction product was washed sequentially with ethanol, acetic acid, and water, followed by replacing the solvent with ethanol. The resulting product was dried to give the modified plant fibers A-1. Tetrahydrofuran was used as a solvent for washing the sample to be evaluated for addition ratio. The addition ratio of the modified synthetic rubber to the plant fibers in the modified plant fibers A-1 was 36 weight %. To be more precise, the ratio of the modified synthetic rubber added is 36 parts by weight relative to 100 parts by weight of the plant fibers. Hereinafter, the "addition ratio" after Example 2 indicates parts by weight of the modified synthetic rubber to 100 parts by weight of the plant fibers, unless otherwise specified.

Application Example 1

An amount of 6.8 parts by weight of the modified plant fibers A-1 was added to 100 parts by weight of natural rubber (TSR 20) so that content of plant fibers was 5 parts by weight, and kneaded in LABO PLASTOMILL® (available from Toyo Seiki Seisaku-sho, Ltd.). The obtained kneaded mixture was pressed at 100° C. to obtain a rubber film having a thickness of 0.1 mm.

Application Comparative Example 1

Dry NBKP was added to 100 parts by weight of natural rubber (TSR 20) so that content of plant fibers was 5 parts by weight, and kneaded in LABO PLASTOMILL® (available from Toyo Seiki Seisaku-sho, Ltd.). The obtained kneaded mixture was pressed at 100° C. to obtain a rubber film having a thickness of 0.1 mm.

Application Comparative Example 2

NBKP was added to 100 parts by weight of the matrix rubber obtained by mixing 20 parts by weight of Ricon® 130MA13 and 80 parts by weight of natural rubber (TSR 20) so that content of plant fibers was 5 parts by weight, and kneaded in LABO PLASTOMILL® (available from Toyo Seiki Seisaku-sho, Ltd.). The obtained kneaded mixture was pressed at 100° C. to obtain a rubber film having a thickness of 0.1 mm.

TABLE 1

|  | Modified plant fibers (A) | Matrix rubber | | Modified plant fibers (A) | | |
|---|---|---|---|---|---|---|
|  |  | Natural rubber | 130MA13 | Content of plant fibers | Defibration State | Dispersion State |
| Application Example 1 | A-1 | 100 | — | 6.8 | 5 | Average | Good |
| Application Comparative Example 2 | — (NBKP) | 100 | — | — | 5 | Poor | Poor |
| Application Comparative Example 3 | — (NBKP) | 80 | 20 | — | 5 | Poor | Poor |

The abbreviations in Table 1 are specified below.
Natural rubber: TSR 20
130MA13: Ricon® 130MA13 (maleic anhydride modified polybutadiene, available from Clay Valley USA, LLC), the number average molecular weight 2,900

Example 2

[Preparation of Modified Plant Fibers (A-2)]

An amount of 250.0 parts by weight (solids: 50.0 parts by weight) of NBKP and 200.0 parts by weight of N-methylpyrrolidone were charged into a vessel, and the water was evaporated off to give a solvent replaced NBKP. The temperature inside the system was adjusted to 70° C., and 50.0 parts by weight of Ricobond® 1756 (maleic anhydride modified polybutadiene, 1,2 addition ratio 70%, available from Clay Valley USA, LLC) and 8.5 parts by weight of potassium carbonate as a catalyst for esterification were introduced into the system and reacted for 2 hours. The reaction product was washed sequentially with ethanol, acetic acid, and water, followed by replacing the solvent with ethanol. The resulting product was dried to give the modified plant fibers A-2. Tetrahydrofuran was used as a solvent for washing the sample to be evaluated for addition ratio. The addition ratio of the modified synthetic rubber to the plant fibers in the modified plant fibers A-2 was 27 weight %.

Example 3

[Preparation of Modified Plant Fibers (A-3)]

An amount of 250.0 parts by weight (solids: 50.0 parts by weight) of NBKP and 200.0 parts by weight of N-methylpyrrolidone were charged into a vessel, and the water was evaporated off to give a solvent replaced NBKP. The temperature inside the system was adjusted to 70° C., and 50.0 parts by weight of POLYVEST® MA75 (maleic anhydride modified polybutadiene, 1,2 addition ratio 1%, available from Evonik Industries AG) and 8.5 parts by weight of potassium carbonate as a catalyst for esterification were introduced into the system and reacted for 2 hours. The reaction product was washed sequentially with ethanol, acetic acid, and water, followed by replacing the solvent with ethanol. The resulting product was dried to give the modified plant fibers A-3. Tetrahydrofuran was used as a solvent for washing the sample to be evaluated for addition ratio. The addition ratio of the modified synthetic rubber to the plant fibers in the modified plant fibers A-3 was 39 weight %.

Example 4

[Preparation of Modified Plant Fibers (A-4)]

An amount of 250.0 parts by weight (solids: 50.0 parts by weight) of NBKP and 200.0 parts by weight of N-methylpyrrolidone were charged into a vessel, and the water was evaporated off to give a solvent replaced NBKP. The temperature inside the system was adjusted to 70° C., and 20.0 parts by weight of Ricon® 130MA13 and 8.5 parts by weight of potassium carbonate as a catalyst for esterification were introduced into the system and reacted for 2 hours. The reaction product was washed sequentially with ethanol, acetic acid, and water, followed by replacing the solvent with ethanol. The resulting product was dried to give the modified plant fibers A-4. Tetrahydrofuran was used as a solvent for washing the sample to be evaluated for addition ratio. The addition ratio of the modified synthetic rubber to the plant fibers in the modified plant fibers A-4 was 12 weight %.

Example 5

[Preparation of Modified Plant Fibers (A-5)]

An amount of 250.0 parts by weight (solids: 50.0 parts by weight) of NBKP and 200.0 parts by weight of N-methylpyrrolidone were charged into a vessel, and the water was evaporated off to give a solvent replaced NBKP. The temperature inside the system was adjusted to 70° C., and 50.0 parts by weight of Ricobond® 1731 (maleic anhydride modified polybutadiene, 1,2 addition ratio 28%, available from Clay Valley USA, LLC) and 8.5 parts by weight of potassium carbonate as a catalyst for esterification were introduced into the system and reacted for 2 hours. The reaction product was washed sequentially with ethanol, acetic acid, and water, followed by replacing the solvent with ethanol. The resulting product was dried to give the modified plant fibers A-5. Tetrahydrofuran was used as a solvent for washing the sample to be evaluated for addition ratio. The addition ratio of the modified synthetic rubber to the plant fibers in the modified plant fibers A-5 was 43 weight %.

Example 6

[Preparation of Modified Plant Fibers (A-6)]

An amount of 250.0 parts by weight (solids: 50.0 parts by weight) of NBKP and 200.0 parts by weight of N-methylpyrrolidone were charged into a vessel, and the water was evaporated off to give a solvent replaced NBKP. The temperature inside the system was adjusted to 70° C., and 50.0 parts by weight of Ricon® 130MA8 and 8.5 parts by weight of potassium carbonate as a catalyst for esterification were introduced into the system and reacted for 2 hours. The reaction product was washed sequentially with ethanol, acetic acid, and water, followed by replacing the solvent with ethanol. The resulting product was dried to give the modified plant fibers A-6. Tetrahydrofuran was used as a solvent for washing the sample to be evaluated for addition ratio. The addition ratio of the modified synthetic rubber to the plant fibers in the modified plant fibers A-6 was 50 weight %.

[Synthesis of Modifier RB-1 for Comparative Examples]

An amount of 540.0 parts by weight of propylene glycol 1-monomethyl ether 2-acetate was charged into a vessel, and was heated to 146° C. While maintaining the temperature inside the system at 146° C., after replacement by nitrogen gas, 350.0 parts by weight of butyl acrylate, 50.0 parts by weight of styrene, 50.0 parts by weight of maleic anhydride, 50.0 parts by weight of propylene glycol 1-monomethyl ether 2-acetate and 22.5 parts by weight of 2,2-azobis-2-methylbutyronitrile were added dropwise over 4 hours. After completion of the dropwise addition, the temperature inside the system was kept at 146 C for 2 hours. Then, propylene glycol 1-monomethyl ether 2-acetate was distilled off by keeping the mixture under a reduced pressure for 2 hours to obtain the modifier RB-1 having the number average molecular weight of 1,500 and the weight average molecular weight of 4,000 which is not a modified synthetic rubber.

[Preparation of Additives for Rubber]

Example 7

The modified plant fibers A-1 and Petocol® LX (petroleum resin, the number average molecular weight 700, the glass transition point 49° C., available from Tosoh Corporation) being a processing agent for rubber (C) were charged in LABO PLASTOMILL® (available from Toyo Seiki Seisaku-sho, Ltd.) so that content of plant fibers was 40 parts by weight, and were melt and kneaded to obtain the additive for rubber E-1.

Examples 8 to 12

The additives for rubber E-2 to E-6 were obtained in the same manner as in Example 7 except that the modified plant fibers shown in Table 2 were used as modified plant fibers and contents of the plant fibers were as shown in Table 2.

Example 13

An amount of 20.0 parts by weight of dry NBKP, 1.0 part by weight of dimethyllaurylamine, 10.0 parts by weight of Ricon® 130MA13 and 19.0 parts by weight of Petocor® LX were charged in LABO PLASTOMILL®, and were melt and kneaded to obtain the additive for rubber E-7 containing the modified plant fibers A-7. In the modified plant fibers A-7, the addition ratio of the modified synthetic rubber to the plant fibers was 33 weight %.

Example 14

An amount of 30.0 parts by weight of dry NBKP, 1.5 parts by weight of dimethyllaurylamine and 18.5 parts by weight of LIR-403 (maleic anhydride modified polyisoprene, the number average molecular weight 34,000, the glass transition point −60° C., available from Kuraray Co., Ltd.) were charged into LABO PLASTOMILL® to obtain a kneaded mixture. An amount of 33.3 parts by weight of the obtained kneaded mixture and 16.7 parts by weight of LIR-403 being a processing agent for rubber (C) were charged into LABO PLASTOMILL® and kneaded to obtain the additive for rubber E-8 containing the modified plant fibers A-8. In the modified plant fibers A-8, the addition ratio of the modified synthetic rubber to the plant fibers was 51 weight %.

Example 15

An amount of 20.0 parts by weight of dry NBKP, 1.0 part by weight of dimethyllaurylamine, 12.5 parts by weight of Ricon® 130MA13 and 16.5 parts by weight of PR-12686F (novolak resin, the number average molecular weight 900, the glass transition point 45° C., available from Sumitomo Bakelite Co., Ltd.) were charged into LABO PLASTOMILL®, and were melt and kneaded to obtain the additive for rubber E-9 containing the modified plant fibers A-9. In the modified plant fibers A-9, the addition ratio of the modified synthetic rubber to the plant fibers was 15 weight %.

Example 16

An amount of 20.0 parts by weight of dry NBKP, 1.0 part by weight of dimethyllaurylamine, 6.0 parts by weight of Ricobond® 1756 (maleic anhydride modified polybutadiene, available from Clay Valley USA, LLC) and 4.0 parts by weight of hexadecenyl succinic anhydride were charged into LABO PLASTOMILL® to obtain a kneaded mixture containing modified plant fibers. An amount of 30.0 parts by weight of the obtained kneaded mixture and 20.0 parts by weight of Ricobond® 1756 being a processing agent for rubber (C) were charged into LABO PLASTOMILL® and were kneaded to obtain the additive for rubber E-10 containing the modified plant fibers A-10. In the modified plant fibers A-10, the addition ratio of the modified synthetic rubber to the plant fibers was 28 weight %.

Comparative Example 1

An amount of 20.0 parts by weight of dry NBKP and 30.0 parts by weight of Petcol® LX were charged into LABO PLASTOMILL®, and were melt and kneaded to obtain the additive for rubber RE-1.

Comparative Example 2

An amount of 20.0 parts by weight of dry NBKP, 10.0 parts by weight of Ricon® 130MA13 and 20.0 parts by weight of Petcol® LX were charged into LABO PLASTOMILL®, and were melt and kneaded to obtain a kneaded mixture containing the modified plant fibers RA-1. In the modified plant fibers RA-1, the addition ratio of the modified synthetic rubber to the plant fibers was 3 weight %. The obtained kneaded mixture was charged into LABO PLASTOMILL®, and was kneaded to obtain the additive for rubber RE-2.

Comparative Example 3

An amount of 20.0 parts by weight of dry NBKP, 1.0 part by weight of dimethyllaurylamine, 10.0 parts by weight of the modifier RB-1 which is not a modified synthetic rubber, and 19.0 parts by weight of Petocor® LX were charged into LABO PLASTOMILL® and were melt and kneaded to obtain the additive for rubber RE-3 containing the modified plant fibers RA-2. In the modified plant fibers RA-2, the addition ratio of RB-1 to the plant fibers was 19 weight %.

Comparative Example 4

The modified plant fibers A-1 and Nisseki Neopolymer 170S (petroleum resin, the number average molecular weight 990, the glass transition point 105° C., available from JX Nippon Oil Energy Co., Ltd.) being a processing agent for rubber (C) were charged in LABO PLASTOMILL® (available from Toyo Seiki Seisaku-sho, Ltd.) so that content of plant fibers was 40 parts by weight, and were melt and kneaded to obtain the additive for rubber RE-4.

Comparative Examples 5 to 7

The additives for rubber RE-5 to E-7 were obtained in the same manner as in Example 2 except that the modified plant fibers shown in Table 2 were used as modified plant fibers and contents of the plant fibers were as shown in Table 2.

Application Example 2

The additive for rubber E-1 was added to 100 parts by weight of natural rubber (TSR 20) so that content of plant fibers was 5 parts by weight, and kneaded in LABO PLASTOMILL® (available from Toyo Seiki Seisaku-sho, Ltd.). The obtained kneaded mixture was pressed at 100° C. to obtain a rubber film having a thickness of 0.1 mm.

Application Examples 3 to 11

The rubber films having a thickness of 0.1 mm were obtained in the same manner as in Application Example 2 except that the additives for rubber shown in Table 3 were used as additives for rubber and contents of the plant fibers were as shown in Table 3.

TABLE 2

|  | Additive for rubber | Modified plant fibers (A) Type | Addition ratio (weight %) | Processing agent for rubber (C) Type | Glass transition point (° C.) | Content of plant fibers (weight %) |
|---|---|---|---|---|---|---|
| Example 7 | E-1 | A-1 | 36 | Petrocol ® LX | 49 | 40 |
| Example 8 | E-2 | A-2 | 27 | Petrocol ® LX | 49 | 40 |
| Example 9 | E-3 | A-3 | 39 | Petrocol ® LX | 49 | 40 |
| Example 10 | E-4 | A-4 | 12 | Petrocol ® LX | 49 | 60 |
| Example 11 | E-5 | A-5 | 43 | Petrocol ® LX | 49 | 15 |
| Example 12 | E-6 | A-6 | 50 | Petrocol ® LX | 49 | 40 |
| Example 13 | E-7 | A-7 | 33 | Petrocol ® LX | 49 | 40 |
| Example 14 | E-8 | A-8 | 51 | LIR-403 | −60 | 40 |
| Example 15 | E-9 | A-9 | 15 | PR-12686F | 45 | 40 |
| Example 16 | E-10 | A-10 | 28 | Ricobond ® 1756 | −18 | 40 |
| Comparative Example 1 | RE-1 | — (NBKP) | — | Petrocol ® LX | 49 | 40 |
| Comparative Example 2 | RE-2 | RA-1 | 3 | Petrocol ® LX | 49 | 40 |
| Comparative Example 3 | RE-3 | RA-2 | 19 | Petrocol ® LX | 49 | 40 |
| Comparative Example 4 | RE-4 | A-1 | 36 | Nisseki neopolymer 170S | 105 | 40 |
| Comparative Example 5 | RE-5 | A-4 | 12 | Petrocol ® LX | 49 | 70 |
| Comparative Example 6 | RE-6 | A-1 | 36 | Petrocol ® LX | 49 | 5 |
| Comparative Example 7 | RE-7 | A-1 | 36 | Stearic acid | — | 40 |

The abbreviations in Table 2 are specified below.

Petrocol® LX: petroleum resin, the number average molecular weight 700, the glass transition point 49° C., available from Tosoh Corporation LIR-403: maleic anhydride modified polyisoprene, the number average molecular weight 34,000, the glass transition point −60° C., available from Kuraray Co., Ltd.

PR-12686F: Novolac resin, the number average molecular weight 900, the glass transition point 45° C., available from Sumitomo Bakelite Co., Ltd.

Nisseki neopolymer 170S: petroleum resin, the number average molecular weight 990, the glass transition point 105° C., available from JX Nippon Oil & Energy Corporation Ricobond® 1756: maleic anhydride modified polybutadiene, the number average molecular weight 2,500, the glass transition point −18° C., available from Clay Valley USA, LLC

Application Comparative Example 3

The additive for rubber RE-1 was added to 100 parts by weight of natural rubber (TSR 20) so that content of plant fibers was 5 parts by weight, and kneaded in LABO PLASTOMILL® (available from Toyo Seiki Seisaku-sho, Ltd.). The obtained kneaded mixture was pressed at 100° C. to obtain a rubber film having a thickness of 0.1 mm.

Application Comparative Example 4

The additive for rubber RE-1 was added to 100 parts by weight of the matrix rubber obtained by mixing 20 parts by weight of Ricon® 130MA13 and 80 parts by weight of natural rubber (TSR 20) so that content of plant fibers was 5 parts by weight, and kneaded in LABO PLASTOMILL® (available from Toyo Seiki Seisaku-sho, Ltd.). The obtained kneaded mixture was pressed at 100° C. to obtain a rubber film having a thickness of 0.1 mm.

Application Comparative Examples 5 to 10

The rubber films having a thickness of 0.1 mm were obtained in the same manner as in Application Comparative Example 3 except that the additives for rubber shown in Table 3 were used as additives for rubber and contents of the plant fibers were as shown in Table 3.

TABLE 3

| | | Content (parts by weight) | | | | |
|---|---|---|---|---|---|---|
| | | Matrix rubber | | Additive for rubber | | |
| | Additive for rubber | Natural rubber | 130MA13 | Content of plant fibers | Defibration State | Dispersion State |
| Application Example 2 | E-1 | 100 | — | 12.5 | 5 | Good | Good |
| Application Example 3 | E-2 | 100 | — | 12.5 | 5 | Good | Good |
| Application Example 4 | E-3 | 100 | — | 12.5 | 5 | Good | Good |
| Application Example 5 | E-4 | 100 | — | 8.3 | 5 | Good | Good |
| Application Example 6 | E-5 | 100 | — | 33.3 | 5 | Good | Good |
| Application Example 7 | E-6 | 100 | — | 12.5 | 5 | Good | Good |
| Application Example 8 | E-7 | 100 | — | 12.5 | 5 | Good | Good |
| Application Example 9 | E-8 | 100 | — | 12.5 | 5 | Good | Good |
| Application Example 10 | E-9 | 100 | — | 12.5 | 5 | Good | Good |
| Application Example 11 | E-10 | 100 | — | 12.5 | 5 | Good | Good |
| Application Comparative Example 3 | RE-1 | 100 | — | 12.5 | 5 | Average | Poor |
| Application Comparative Example 4 | RE-1 | 80 | 20 | 12.5 | 5 | Average | Poor |
| Application Comparative Example 5 | RE-2 | 100 | — | 12.5 | 5 | Average | Poor |
| Application Comparative Example 6 | RE-3 | 100 | — | 12.5 | 5 | Average | Poor |
| Application Comparative Example 7 | RE-4 | 100 | — | 12.5 | 5 | Poor | Poor |
| Application Comparative Example 8 | RE-5 | 100 | — | 7.1 | 5 | Poor | Poor |
| Application Comparative Example 9 | RE-6 | 100 | — | 100 | 5 | Poor | Poor |
| Application Comparative Example 10 | RE-7 | 100 | — | 12.5 | 5 | Poor | Poor |

The abbreviations in Table 3 are specified below.
Natural rubber: TSR 20
130MA13: Ricon® 130MA13 (maleic anhydride modified polybutadiene, available from Clay Valley USA, LLC)

Application Example 12

The additive for rubber E-1 was added to 100 parts by weight of natural rubber (TSR 20) so that content of plant fibers was 1.88 parts by weight, and further 1.5 parts by weight of stearic acid, 3.0 parts by weight of zinc oxide, 2.0 parts by weight of sulfur and 1.5 parts by weight of N-cyclohexyl-2-benzothiazolylsulfenamide were added thereto to prepare a kneaded mixture. The obtained kneaded mixture was pressed and molded at 160° C. for 20 minutes and vulcanized to obtain the rubber composition F-1 molded into a disc shape of a diameter of 25 mm and a thickness of 3 mm.

Application Example 13

The rubber composition F-2 was obtained in the same manner as in Example 18 using the additives for rubber E-3.

Application Comparative Example 11

The rubber composition RF-1 was obtained in the same manner as in Example 18 using the additives for rubber RE-3.

Application Comparative Example 12

The rubber composition RF-2 was obtained in the same manner as in Example 18 except that NBKP was added to 20 parts by weight of Ricon® 130MA13 and 80 parts by weight of natural rubber (TSR 20) so that content of plant fibers was 1.88 parts by weight.

TABLE 4

| | | Content (parts by weight) | | | | |
|---|---|---|---|---|---|---|
| | | Matrix rubber | | Additive for rubber | | |
| Rubber composition | Additive for rubber | Natural rubber | 130MA13 | | Content of plant fibers | Rubber hardness |
| Application Example 12 | F-1 | E-1 | 100 | — | 4.7 | 1.88 | A 54 |
| Application Example 13 | F-2 | E-3 | 100 | — | 4.7 | 1.88 | A 55 |
| Application Comparative Example 11 | RF-1 | RE-3 | 100 | — | 4.7 | 1.88 | A 51 |
| Application Comparative Example 12 | RF-2 | — (NBKP) | 80 | 20 | — | 1.88 | A 52 |

The abbreviations in Table 4 are specified below.

Natural rubber: TSR 20

130MA13: Ricon® 130MA13 (maleic anhydride modified polybutadiene, available from Clay Valley USA, LLC)

From the results of Application Example 1 and Application Comparative Examples 1 to 2, it is understood that dispersion state in rubber is improved by covalent bonding of a modified synthetic rubber (B) to plant fibers (a).

From Application Examples 2 to 11 and Application Comparative Examples 3 to 4, it is understood that fibers cannot be sufficiently defibrated without modification of plant fibers, and that neither of defibration and dispersibility can be achieved without covalent bonding of a modified synthetic rubber (B) to plant fibers (a).

From Application Example 2 and Application Comparative Example 5, it is understood that fibers cannot be sufficiently defibrated and dispersibility cannot be secured, without covalent bonding of a sufficient amount of a modified synthetic rubber (B) to plant fibers (a).

From Application Example 2 and Application Comparative Example 6, it is understood that dispersibility cannot be secured without covalent bonding of a modified synthetic rubber (B) to plant fibers (a) in advance.

From Application Example 2 and Application Comparative Example 7, it is understood that neither of defibration and dispersibility can be secured when a glass transition point of a processing agent for rubber (C) exceeds 100° C.

In the comparison of Application Example 5 in which the additive for rubber includes 67 weight % of the modified plant fibers (A) and Application Comparison Example 8 in which the additive for rubber includes 78 weight % of the modified plant fibers (A), it is understood that neither of defibration and dispersibility can be secured when content of modified plant fibers (A) in an additive for rubber exceed 75 weight %.

From Application Example 2 and Application Comparative Example 10, it is understood that neither of defibration and dispersibility can be secured when a number average molecular weight of a processing agent for rubber (C) is less than 400.

From Application Examples 2, 3, 7 and 9, it is understood that a modified synthetic rubber (B) has the effect irrespective of the type of rubber, and both of defibration and dispersibility can be secured even if polymerization method or detailed chemical structure derived therefrom is different.

From Application Examples 2 and 8, it is understood that both of defibration and dispersibility can be secured even if modification method of plant fibers is changed.

From Application Examples 8, 9, 10 and 11, it is understood that both of defibration and dispersibility can be secured even if types of a processing agent for rubber (C) are changed.

From Application Examples 12 to 13 and Application Comparative Examples 11 to 12, it is understood that rubber hardness of a rubber composition is improved by covalently bonding of a modified synthetic rubber (B) to plant fibers (a) in advance.

From Application Examples 1 to 13, it is understood that plant fibers can be dispersed into rubber easily and favorably by using the additive for rubber of the present invention even without using water for conjugating plant fibers and rubber.

The invention claimed is:

1. An additive for rubber comprising 20 to 75 weight % of the modified plant fibers (A) in which plant fibers (a) and a modified synthetic rubber (B) are covalently bonded wherein the ratio of the modified synthetic rubber (B) relative to 100 parts by weight of the plant fibers (a) is 5 to 100 parts by weight: and 25 to80 weight % of a processing agent for rubber (C), wherein the number average molecular weight of the processing agent for rubber (C) is 400 to 60,000, and the glass transition point of the processing agent for rubber (C) is 100° C. or less, and wherein the additive for rubber includes plant fibers in the ratio of 10 to 65 weight %.

2. The additive for rubber according to claim 1, wherein the modified plant fibers (A) are micronized modified plant fibers.

3. The additive for rubber according to claim 1, wherein the modified synthetic rubber (B) is a maleic anhydride modified diene rubber.

4. The additive for rubber according to claim 3, wherein the maleic anhydride modified diene rubber is a maleic anhydride modified polybutadiene and/or a maleic anhydride modified polyisoprene.

5. A rubber composition comprising the additive for rubber according to claim 1, wherein the rubber composition includes plant fibers in the ratio of 0.01 to 30 parts by weight relative to 100 parts by weight of matrix rubber.

6. The additive for rubber according to claim 2, wherein the modified synthetic rubber (B) is a maleic anhydride modified diene rubber.

7. A method of preparing the additive for rubber according to claim 1 comprising,
- a step of reacting the plant fibers (a) and the modified synthetic rubber (B) in the processing agent for rubber (C), to obtain a mixture containing modified plant fibers (D); and
- a step of kneading the mixture (D) at a lower temperature than the temperature in the first step, to micronize the fibers.

8. A method of preparing the additive for rubber according to claim 2 comprising,
- a step of reacting the plant fibers (a) and the modified synthetic rubber (B) in the processing agent for rubber (C), to obtain a mixture containing modified plant fibers (D); and
- a step of kneading the mixture (D) at a lower temperature than the temperature in the first step, to micronize the fibers.

9. A method of preparing the additive for rubber according to claim 3 comprising,
- a step of reacting the plant fibers (a) and the modified synthetic rubber (B) in the processing agent for rubber (C), to obtain a mixture containing modified plant fibers (D); and
- a step of kneading the mixture (D) at a lower temperature than the temperature in the first step, to micronize the fibers.

10. A method of preparing the additive for rubber according to claim 4 comprising,
- a step of reacting the plant fibers (a) and the modified synthetic rubber (B) in the processing agent for rubber (C), to obtain a mixture containing modified plant fibers (D); and
- a step of kneading the mixture (D) at a lower temperature than the temperature in the first step, to micronize the fibers.

11. A method of preparing the additive for rubber according to claim 6 comprising,
- a step of reacting the plant fibers (a) and the modified synthetic rubber (B) in the processing agent for rubber (C), to obtain a mixture containing modified plant fibers (D); and
- a step of kneading the mixture (D) at a lower temperature than the temperature in the first step, to micronize the fibers.

12. A rubber composition comprising the additive for rubber according to claim 2, wherein the rubber composition includes plant fibers in the ration of 0.01 to 30 parts by weight relative to 100 parts by weight of matrix rubber.

13. A rubber composition comprising the additive for rubber according to claim 3, wherein the rubber composition includes plant fibers in the ration of 0.01 to 30 parts by weight relative to 100 parts by weight of matrix rubber.

14. A rubber composition comprising the additive for rubber according to claim 4, wherein the rubber composition includes plant fibers in the ration of 0.01 to 30 parts by weight relative to 100 parts by weight of matrix rubber.

15. A rubber composition comprising the additive for rubber according to claim 6, wherein the rubber composition includes plant fibers in the ration of 0.01 to 30 parts by weight relative to 100 parts by weight of matrix rubber.

* * * * *